US009551228B2

(12) United States Patent
Propheter-Hinckley et al.

(10) Patent No.: US 9,551,228 B2
(45) Date of Patent: Jan. 24, 2017

(54) AIRFOIL AND METHOD OF MAKING

(71) Applicant: United Technologies Corporation, Hartford, CT (US)

(72) Inventors: Tracy A. Propheter-Hinckley, Manchester, CT (US); San Quach, East Hartford, CT (US); Matthew A. Devore, Cromwell, CT (US)

(73) Assignee: United Technologies Corporation, Hartford, CT (US)

( * ) Notice: Subject to any disclaimer, the term of this patent is extended or adjusted under 35 U.S.C. 154(b) by 1030 days.

(21) Appl. No.: 13/737,200

(22) Filed: Jan. 9, 2013

(65) Prior Publication Data

US 2014/0199177 A1 Jul. 17, 2014

(51) Int. Cl.

*F01D 5/18* (2006.01)
*B23P 15/04* (2006.01)
*B22C 9/10* (2006.01)

(52) U.S. Cl.

CPC . *F01D 5/187* (2013.01); *B22C 9/10* (2013.01); *B22C 9/103* (2013.01); *F01D 5/186* (2013.01); *F05D 2260/201* (2013.01); *F05D 2260/202* (2013.01); *F05D 2260/205* (2013.01); *Y10T 29/49337* (2015.01)

(58) Field of Classification Search

CPC ... F01D 5/186; F01D 5/187; F05D 2260/201; F05D 2260/202; F05D 2260/205; B22C 9/10; B22C 9/103; B23P 15/04; Y10T 29/49337

See application file for complete search history.

(56) References Cited

U.S. PATENT DOCUMENTS

| | | | | |
|---|---|---|---|---|
| 6,168,381 B1 | 1/2001 | Reddy | | |
| 6,637,500 B2 | 10/2003 | Shah et al. | | |
| 6,929,054 B2 | 8/2005 | Beals et al. | | |
| 7,270,170 B2 | 9/2007 | Beals et al. | | |
| 7,364,405 B2 | 4/2008 | Cunha et al. | | |
| 7,458,778 B1 * | 12/2008 | Liang | F01D 5/187 | 416/97 R |
| 7,478,994 B2 * | 1/2009 | Cunha | F01D 5/18 | 415/115 |
| 7,481,622 B1 * | 1/2009 | Liang | F01D 5/186 | 415/115 |
| 7,481,623 B1 * | 1/2009 | Liang | F01D 5/186 | 416/97 R |
| 7,520,725 B1 * | 4/2009 | Liang | F01D 5/186 | 416/97 R |
| 7,527,474 B1 | 5/2009 | Liang | | |
| 7,530,789 B1 * | 5/2009 | Liang | F01D 5/186 | 415/115 |

(Continued)

FOREIGN PATENT DOCUMENTS

| | | |
|---|---|---|
| EP | 1267038 A2 | 12/2002 |
| EP | 1526250 A2 | 4/2005 |

OTHER PUBLICATIONS

International Searching Authority, PCT Notification of Transmittal of the International Search Report and Written Opinion, Feb. 26, 2014, 13 pages.

(Continued)

*Primary Examiner* — Igor Kershteyn

(74) *Attorney, Agent, or Firm* — Kinney & Lange, P.A.

(57) ABSTRACT

An airfoil includes leading and trailing edges, a first exterior wall extending from the leading edge to the trailing edge and having inner and outer surfaces, a second exterior wall extending from the leading edge to the trailing edge generally opposite the first exterior wall and having inner and outer surfaces, and cavities within the airfoil. A first cavity extends along the inner surface of the first exterior wall and a first inner wall and has an upstream end and a downstream end, and a feed cavity is located between the first inner wall and the second exterior wall.

20 Claims, 5 Drawing Sheets

(56) References Cited

U.S. PATENT DOCUMENTS

| | | | | |
|---|---|---|---|---|
| 7,556,476 | B1 * | 7/2009 | Liang | F01D 5/188 415/115 |
| 7,695,246 | B2 * | 4/2010 | Cunha | B22C 9/04 416/193 A |
| 7,731,481 | B2 | 6/2010 | Cunha et al. | |
| 7,744,347 | B2 | 6/2010 | Cunha et al. | |
| 7,967,563 | B1 * | 6/2011 | Liang | F01D 5/186 415/115 |
| 8,070,443 | B1 | 12/2011 | Liang | |
| 8,109,725 | B2 | 2/2012 | Abdel-Messeh et al. | |
| 8,157,527 | B2 | 4/2012 | Piggush et al. | |
| 8,291,963 | B1 | 10/2012 | Trinks et al. | |
| 8,292,581 | B2 * | 10/2012 | Poon | B22C 9/10 416/97 R |
| 8,302,668 | B1 | 11/2012 | Bullied et al. | |
| 8,333,233 | B2 | 12/2012 | Abdel-Messeh et al. | |
| 8,347,947 | B2 | 1/2013 | Dube et al. | |
| 8,348,614 | B2 | 1/2013 | Piggush et al. | |
| 8,353,329 | B2 | 1/2013 | Gleiner et al. | |
| 2003/0026698 | A1 | 2/2003 | Flodman et al. | |
| 2007/0128031 | A1 | 6/2007 | Liang | |
| 2007/0128032 | A1 | 6/2007 | Lee et al. | |
| 2007/0128034 | A1 | 6/2007 | Lee et al. | |
| 2009/0148269 | A1 | 6/2009 | Fisk | |
| 2010/0104419 | A1 | 4/2010 | Liang | |
| 2010/0221098 | A1 | 9/2010 | Cunha et al. | |
| 2010/0221121 | A1 | 9/2010 | Liang | |
| 2010/0254801 | A1 | 10/2010 | Tibbott | |
| 2012/0269648 | A1 | 10/2012 | Lee | |

OTHER PUBLICATIONS

Extended European search Report for EP Application 13870936.5, dated May 2, 2016, 9 pages.

* cited by examiner

AIRFOIL AND METHOD OF MAKING

STATEMENT OF GOVERNMENT INTEREST

This invention was made with government support under Contract No. N00019-12-D-0002 awarded by the United States Navy. The government has certain rights in the invention.

BACKGROUND

Turbine engine components, such as turbine blades and vanes, are operated in high temperature environments. To avoid deterioration in the components resulting from their exposure to high temperatures, it is necessary to provide cooling to the components. Turbine blades and vanes are subjected to high thermal loads on both the suction and pressure sides of their airfoil portions and at both the leading and trailing edges. The regions of the airfoils having the highest thermal load can differ depending on engine design and specific operating conditions. Casting processes using ceramic cores now offer the potential to provide specific cooling passages for turbine components such as blade and vane airfoils and seals. Cooling circuits can be placed just inside the walls of the airfoil through which a cooling fluid flows to cool the airfoil.

SUMMARY

An airfoil includes leading and trailing edges, a first exterior wall extending from the leading edge to the trailing edge and having inner and outer surfaces, a second exterior wall extending from the leading edge to the trailing edge generally opposite the first exterior wall and having inner and outer surfaces, and cavities within the airfoil. A first cavity extends along the inner surface of the first exterior wall and a first inner wall and has an upstream end and a downstream end, and a feed cavity is located between the first inner wall and the second exterior wall.

A method of forming an airfoil includes forming a first ceramic core having a first side with a first length and a second side generally opposite the first side with a second length, forming a second ceramic core having a length generally greater than or equal to the first length, forming a core assembly and casting the airfoil. Forming the core assembly includes positioning the second ceramic core so that it is proximate but spaced from the first side of the first ceramic core. The core assembly is used during casting to provide the airfoil with a central core passage and a first internal cooling circuit located on one side of the central core passage. The first internal cooling circuit has a length generally greater than or equal to a length of the side of the central core passage proximate to the first internal cooling circuit.

An airfoil includes a leading edge wall, a trailing edge and first and second exterior side walls extending between the leading edge wall and the trailing edge; a central feed cavity; an impingement cavity located between the central feed cavity and the leading edge wall; and a first cooling circuit insulating the central feed cavity from the first exterior side wall.

DETAILED DESCRIPTION

Cooling circuits for components such as airfoils can be prepared by investment casting using ceramic cores. Advances in ceramic manufacturing permit the formation of thinner ceramic cores that can be used to cast airfoils and other structures. Thinner ceramic cores enable new cooling configurations for use in blade and vane airfoils.

Investment casting is one technique used to create hollow components such as compressor and turbine blades and vanes for gas turbine engines. In some investment casting methods, ceramic core elements are used to form the inner passages of blade and vane airfoils and platforms. A core assembly of a plurality of core elements is assembled. A wax pattern is formed over the core assembly. A ceramic shell is then formed over the wax pattern and the wax pattern is removed from the shell. Molten metal is introduced into the ceramic shell. The molten metal, upon cooling, solidifies and forms the walls of the airfoil and/or platform. The ceramic cores can form inner passages for a cooling fluid such as cooling air within the airfoil and/or platform. The ceramic shell is removed from the cast part. Thereafter, the ceramic cores are removed, typically chemically, using a suitable removal technique. Removal of the ceramic cores leaves one or more feed cavities and cooling circuits within the wall of the airfoil and/or platform.

Figure 1A:
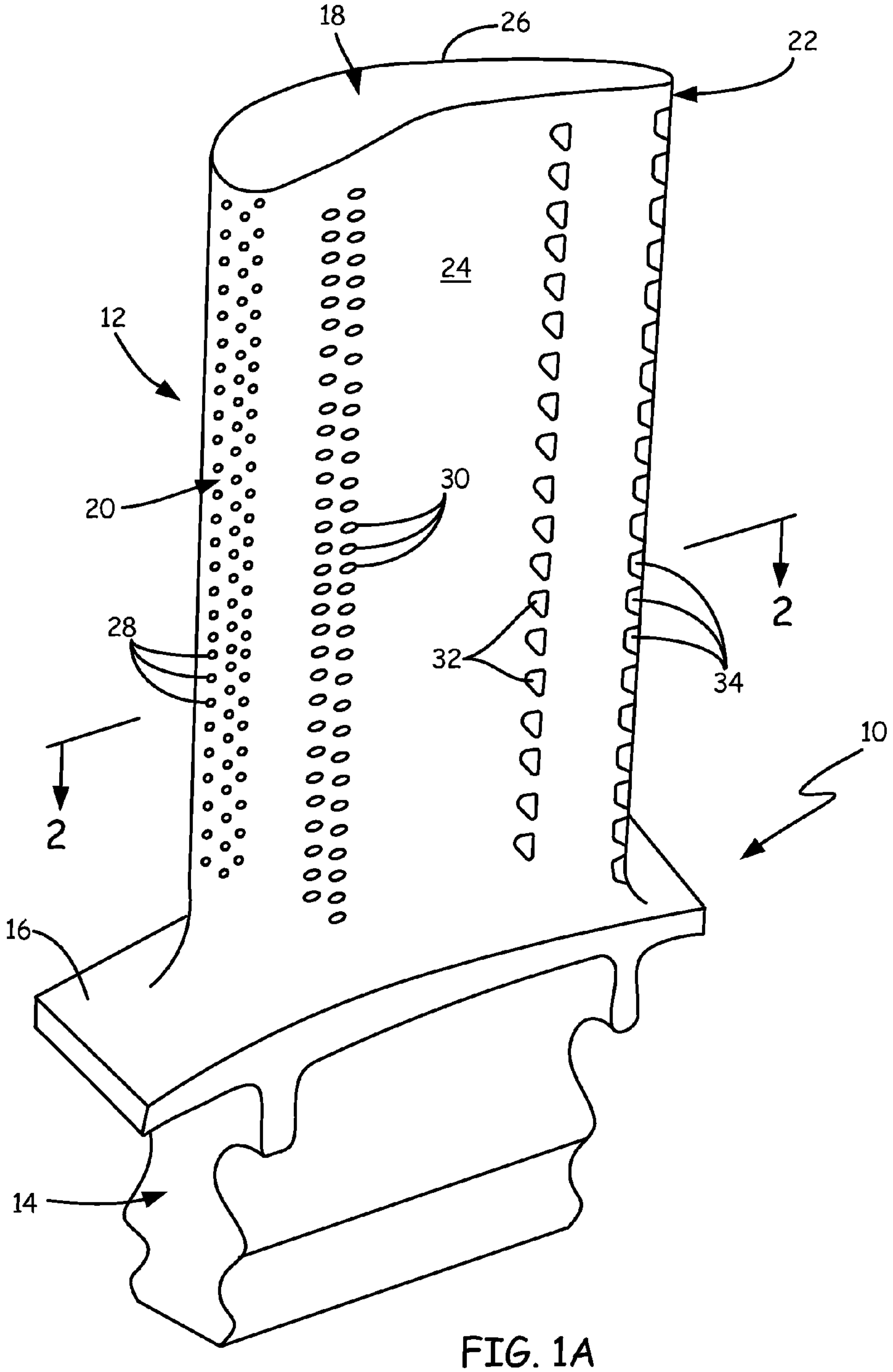
FIG. 1A is a perspective view of a blade having an airfoil according to one embodiment of the present invention.

FIG. 1A illustrates a perspective view of blade 10 having an airfoil 12 according to one embodiment of the present invention. While additional details of airfoil 12 are described below with respect to blade 10, the structure of airfoil 12 is also applicable to airfoils belonging to vanes. Blade 10 includes airfoil 12, root section 14 and platform 16. Airfoil 12 extends from platform 16 to tip section 18. Root section 14 extends from platform 16 in the opposite direction of airfoil 12 where it is received in a slot on a rotor (not shown). Airfoil 12 includes leading edge wall 20, trailing edge 22, pressure side wall 24 and suction side wall 26. Pressure side wall 24 and suction side wall 26 extend from leading edge wall 20 to trailing edge 22 on opposite sides of airfoil 12. Together, leading edge wall 20, pressure side wall 24 and suction side wall 26 form the exterior of airfoil 12. Airfoil 12 includes multiple internal cavities housed within its exterior. Cooling holes on the exterior of airfoil 12 communicate with the internal cavities to allow a film of cooling fluid to form over one or more of leading edge wall 20, pressure side wall 24 and suction side wall 26 or along trailing edge 22. In the embodiment shown in FIG. 1A, cooling holes 28 are located along leading edge wall 20, cooling holes 30 and 32 are located along pressure side wall 24 and cooling slots 34 are located along trailing edge 22.

Figure 1B:
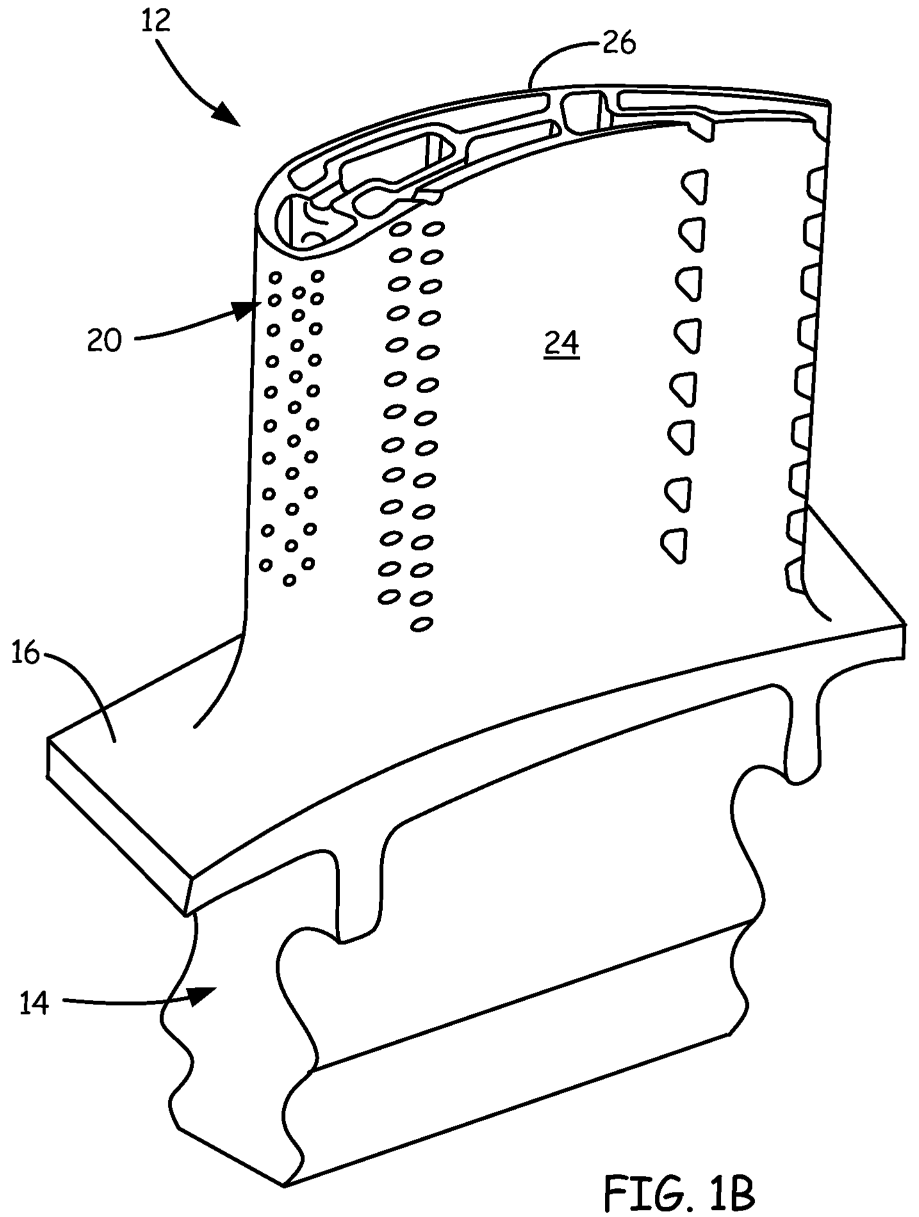
FIG. 1B is a perspective view of the airfoil shown in FIG. 1 with part of the airfoil cut away.
Figure 2:
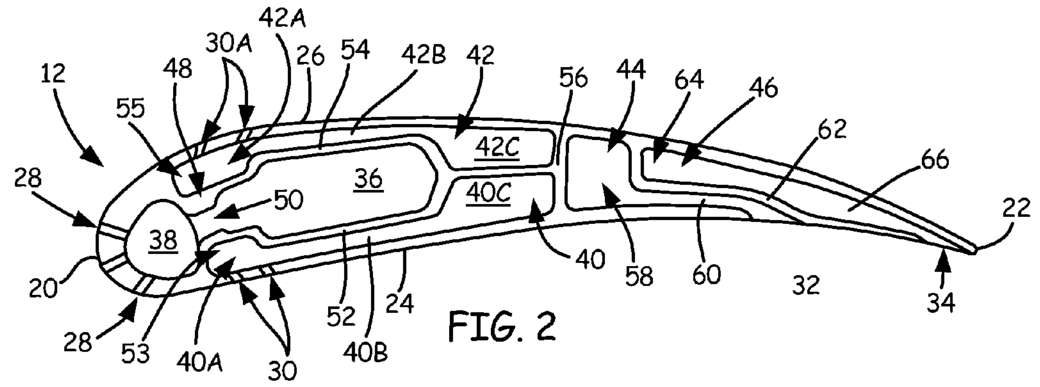
FIG. 2 is a cross section view of the airfoil of FIG. 1 taken along the line 2-2.

FIG. 1B illustrates a view of blade 10 with part of airfoil 12 cut away to illustrate the internal features of airfoil 12. FIG. 2 is a cross section view of the airfoil of FIG. 1 taken along the line 2-2 and further illustrates the internal features of airfoil 12. Airfoil 12 includes a number of cavities enclosed within leading edge wall 20, pressure side wall 24 and suction side wall 26. Cooling fluid (e.g., cooling air) can be fed into each cavity to cool airfoil 12 both internally and externally. Cooling fluid flowing through the internal cavities cools the internal walls and ribs that separate the cavities. Cooling holes on the exterior walls of airfoil 12 allow cooling fluid to exit the internal cavities and form a cooling film along the airfoil exterior, cooling the external surfaces of airfoil 12. FIG. 2 illustrates feed cavity 36, impingement cavity 38, pressure side cavity 40, suction side cavity 42, intermediate cavity 44 and trailing edge cavity 46.

As shown in FIG. 2, feed cavity 36 is generally centrally located within airfoil 12. Cooling fluid can be delivered to feed cavity from a source such as air bled from a compressor stage of a gas turbine engine. In the case of blade 10, cooling fluid can enter feed cavity 36 of airfoil 12 from root section 14 or platform 16. In the case of vanes, cooling fluid can enter feed cavity 36 of airfoil 12 from inner diameter or outer diameter platforms. In some embodiments, cooling fluid travels from feed cavity 36 to impingement cavity 38. Impingement cavity 38 is located generally upstream from feed cavity 36. Feed cavity 36 and impingement cavity 38 are generally separated by internal rib 48, but fluidly communicate through one or more channels (or "crossovers") 50 present in rib 48.

Cooling fluid that flows from feed cavity 36 to impingement cavity 38 can exit impingement cavity through cooling holes 28. Cooling holes 28 are openings in leading edge wall 20 that communicate with impingement cavity 38. Cooling holes 28 along leading edge wall 20 are sometimes referred to as showerhead cooling holes. Cooling fluid that exits impingement cavity 38 through cooling holes 28 cools the interior and exterior surfaces of leading edge wall 20 and can form a cooling film as the cooling fluid is directed downstream by the mainstream (hot gas path) flow along pressure side wall 24 and/or suction side wall 26. The leading edges of airfoils are often subjected to the mainstream air flow having the highest temperature. Thus, when the cooling fluid exiting impingement cavity 38 through cooling holes 28 has a low temperature, the cooling fluid provides the best cooling to the exterior of leading edge wall 20. In order to provide the cooling fluid that exits cooling holes 28 with the lowest possible temperature, feed cavity 36 is insulated from the heat carried by the mainstream air flow. Feed cavity 36 is insulated from the mainstream air flow and high temperature portions of airfoil 12 by pressure side cavity 40 and suction side cavity 42.

Pressure side cavity 40 is a cooling circuit located between feed cavity 36 and pressure side wall 24. Pressure side cavity 40 is separated from feed cavity 36 by internal wall 52. Cooling fluid flows through pressure side cavity 40, which provides cooling to both internal wall 52 and pressure side wall 24.

In the embodiment shown in FIG. 2, pressure side cavity 40 includes upstream plenum section 40A, intermediate section 40B and downstream plenum section 40C. Upstream plenum section 40A and downstream plenum section 40C are located at respective upstream and downstream ends of pressure side cavity 40. In one embodiment, cooling fluid enters pressure side cavity 40 from root section 14 at a region near downstream plenum section 40C. As the cooling fluid flows through pressure side cavity 40 from platform 16 towards tip section 18, a network of trips strips and pedestals (not shown in FIG. 2) present within pressure side cavity 40 direct the cooling fluid upstream towards intermediate section 40B and upstream plenum section 40A. The trip strips and pedestals create tortuous paths for the cooling fluid, which enhances heat transfer in pressure side cavity 40. The cooling fluid travels upstream from downstream plenum section 40C through intermediate section 40B and to upstream plenum section 40A where the cooling fluid exits pressure side cavity 40 through cooling holes 30. As the cooling fluid flows through pressure side cavity 40, it cools a portion of pressure side wall 24. Depending on the temperature of internal wall 52, the cooling fluid flowing through pressure side cavity 40 can cool internal wall 52 and/or insulate internal wall 52 from the high temperatures experienced by pressure side wall 24. Once the cooling fluid exits pressure side cavity 40 through cooling holes 30, the cooling fluid forms a cooling film along the exterior of pressure side wall 24, thereby providing additional cooling to pressure side wall 24. In alternate embodiments, cooling fluid can enter pressure side cavity 40 from root section 14 at upstream plenum section 40A and flow through intermediate section 40B to downstream plenum section 40C.

In the embodiment shown in FIG. 2, upstream plenum section 40A and downstream plenum section 40C have a lateral thickness greater than intermediate section 40B (i.e. plenum sections 40A and 40C extend farther from pressure side wall 24 towards the center of airfoil 12). The increased lateral thickness of upstream plenum section 40A can provide a backstrike region that can aid in the formation of cooling holes 30. Cooling holes 30 can be drilled through pressure side wall 24 into upstream plenum section 40A. Due to the generally small lateral width of pressure side cavity 40, the drilling of cooling holes 30 can be difficult in some circumstances. To reduce the likelihood that a hole is unintentionally drilled through internal wall 52 when cooling holes 30 are drilled through pressure side wall 24, upstream plenum section 40A includes backstrike region 53, which allows additional clearance between pressure side wall 24 and internal wall 52. Cavities having the shape of pressure side cavity 40 shown in FIG. 2 are herein referred to as "dog bone" cavities.

Suction side cavity 42 is similar to pressure side cavity 40, but located on the opposite side of feed cavity 36. Suction side cavity 42 is a cooling circuit located between feed cavity 36 and suction side wall 26. Suction side cavity 42 is separated from feed cavity 36 by internal wall 54. Cooling fluid flows through suction side cavity 42, which provides cooling to both internal wall 54 and suction side wall 26.

In the embodiment shown in FIG. 2, suction side cavity 42 includes upstream plenum section 42A, intermediate section 42B and downstream plenum section 42C. Upstream plenum section 42A and downstream plenum section 42C are located at respective upstream and downstream ends of suction side cavity 42 Like pressure side cavity 40, in some embodiments cooling fluid enters suction side cavity 42 from root section 14 at a region near downstream plenum section 42C. As the cooling fluid flows through suction side cavity 42 from platform 16 towards tip section 18, a network of trips strips and pedestals present within suction side cavity 42 direct the cooling fluid upstream towards intermediate section 42B and upstream plenum section 42A. The cooling fluid travels upstream from downstream plenum section 42C through intermediate section 42B and to upstream plenum section 42A where the cooling fluid exits suction side cavity 42 through cooling holes 30A. As the cooling fluid flows through suction side cavity 42, it cools a portion of suction side wall 26. Depending on the temperature of internal wall 54, the cooling fluid flowing through suction side cavity 42 can cool internal wall 54 or insulate internal wall 54 from the high temperatures experienced by suction side wall 26. Once the cooling fluid exits suction side cavity 42 through cooling holes 30A, the cooling fluid forms a cooling film along the exterior of suction side wall 26, thereby providing additional cooling to suction side wall 26. In alternate embodiments, cooling fluid can enter suction side cavity 42 from root section 14 at upstream plenum section 42A and flow through intermediate section 42B to downstream plenum section 42C.

Like pressure side cavity 40, suction side cavity 42 can include plenum sections 42A and 42C that are laterally thicker than intermediate section 42B. In the embodiment shown in FIG. 2, upstream plenum section 42A and downstream plenum section 42C have a lateral thickness greater than intermediate section 42B. The increased lateral thickness of upstream plenum section 42A can provide backstrike region 55, which allows additional clearance between suction side wall 26 and internal wall 54 so that cooling holes 30A can be drilled through suction side wall 26 into upstream plenum section 42A.

In some embodiments, pressure side cavity 40 extends along pressure side wall 24 both upstream (i.e. toward the leading edge) of feed cavity 36 and downstream (i.e. toward the trailing edge) of feed cavity 36. That is, pressure side cavity 40 has an axial length greater than that of feed cavity 36 and extends farther both upstream and downstream than feed cavity 36. By sizing pressure side cavity 40 larger than feed cavity 36 and locating feed cavity 36 between the ends of pressure side cavity 40, feed cavity 36 can be insulated from the heat conducted through pressure side wall 24 by the high temperature gases flowing past wall 24. In some embodiments, suction side cavity 42 can have an axial length greater than that of feed cavity 36 and extend both upstream and downstream of feed cavity 36. By locating feed cavity 36 between suction side cavity 42 and pressure side cavity 40, feed cavity 36 can be insulated from the heat conducted through suction side wall 26 and pressure side wall 24 by the high temperature gases flowing past walls 24 and 26. In some embodiments, both pressure side cavity 40 and suction side cavity 42 can have axial lengths greater than that of feed cavity 36 and both side cavities 40 and 42 can extend upstream and downstream of feed cavity 36 to insulate feed cavity 36 from the heat conducted through both pressure side wall 24 and suction side wall 26.

FIG. 2 illustrates airfoil 12 having both pressure side cavity 40 and suction side cavity 42 to insulate feed cavity 36. In some embodiments, only one side cavity is needed to adequately insulate feed cavity 36. In such embodiments, airfoil 12 can include only pressure side cavity 40 or airfoil 12 can include only suction side cavity 42.

Airfoil 12 also includes intermediate cavity 44. As shown in FIG. 2, intermediate cavity 44 is located downstream from pressure side cavity 40 and suction side cavity 42, separated from both cavities by rib 56. Intermediate cavity 44 includes feed region 58 and cooling leg 60. Cooling leg 60 extends downstream from feed region 58. Cooling leg 60 can extend along pressure side wall 24 as shown in FIG. 2. Alternatively, cooling leg 60 can extend along suction side wall 26. Cavities having the shape of intermediate cavity 44 shown in FIG. 2 are herein referred to as "flag" cavities.

Feed region 58 receives cooling fluid from root section 14 or platform 16. The cooling fluid flows from feed region 58 through cooling leg 60 and exits airfoil 12 through cooling holes 32. Once the cooling fluid has exited through cooling holes 32, the cooling fluid forms a cooling film along the exterior of pressure side wall 24 Like pressure side cavity 40 and suction side cavity 42, cooling leg 60 can contain a plurality of pedestals and trip strips to create tortuous paths for the cooling fluid to travel through cooling leg 60 before exiting through cooling holes 32. The cooling fluid flowing through feed region 58 cools the surrounding rib 56, pressure side wall 24 and suction side wall 26. The cooling fluid flowing through cooling leg 60 cools the surrounding wall surfaces, pressure side wall 24 and internal wall 62 in the embodiment shown in FIG. 2. In some embodiments, cooling holes 32 are formed in pressure side wall 24 (or suction side wall 26) during casting.

Trailing edge cavity 46 is located downstream of intermediate cavity 44. As shown in FIG. 2, trailing edge cavity 46 is separated from intermediate cavity 44 by internal wall 62. Trailing edge cavity 46 includes feed region 64 and cooling leg 66. Cooling leg 66 extends generally downstream from feed region 64 between downstream portions of pressure side wall 24 and suction side wall 26. Feed region 64 receives cooling fluid from root section 14 or platform 16. The cooling fluid flows from feed region 64 through cooling leg 66 and exits trailing edge 22 of airfoil 12 through cooling slots 34. Like pressure side cavity 40, suction side cavity 42 and cooling leg 60, cooling leg 66 can contain a plurality of pedestals and trip strips to create tortuous paths for the cooling fluid to travel through cooling leg 66 before exiting through cooling holes 32. In the embodiment shown in FIG. 2, the cooling fluid flowing through feed region 64 cools a portion of internal wall 62 and suction side wall 26. The cooling fluid flowing through cooling leg 66 cools the surrounding wall surfaces: internal wall 62, pressure side wall 24 and suction side wall 26.

Figure 3:
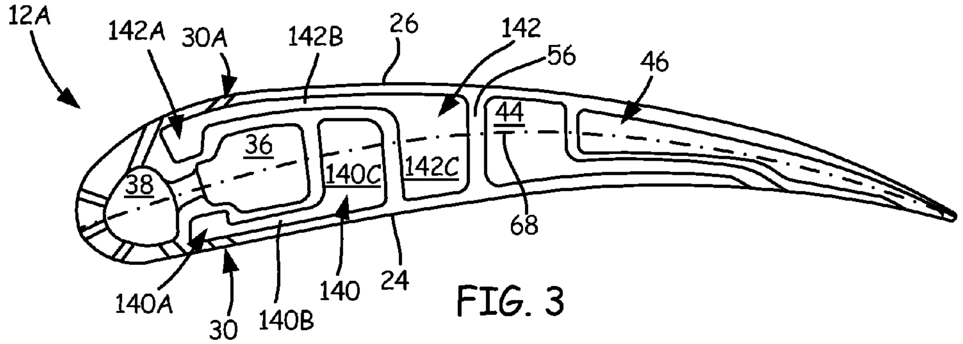
FIG. 3 is a cross section view of another embodiment of an airfoil.

FIG. 3 illustrates a cross section view of airfoil 12A, another embodiment of a blade or vane airfoil. Airfoil 12A differs from airfoil 12 shown in FIGS. 1A, 1B and 2 in a few different respects.

The pressure side and suction side cavities are shaped differently from pressure side cavity 40 and suction side cavity 42 of airfoil 12. Pressure side cavity 140 includes upstream plenum section 140A, intermediate section 140B and downstream plenum section 140C. Suction side cavity 142 includes upstream plenum section 142A, intermediate section 142B and downstream plenum section 142C. Instead of pressure side cavity 140 generally minoring suction side cavity 142, downstream plenum section 140C is located just downstream of feed cavity 36 and downstream plenum section 142C is located downstream of downstream plenum section 140C. Feed cavity 36 is insulated by all portions of pressure side cavity 140 (upstream plenum section 140A, intermediate section 140B and downstream plenum section 140C) and upstream plenum section 142A and intermediate section 142B of suction side cavity 142.

Pressure side cavity 140 and suction side cavity 142 also span a greater distance laterally than pressure side cavity 40 and suction side cavity 42 of airfoil 12 shown in FIG. 2. Airfoil 12A includes camber line 68. Camber line 68 represents a line that is midway between the exterior surfaces of pressure side wall 24 and suction side wall 26. As shown in FIG. 3, downstream plenum section 140C crosses camber line 68 so that portions of downstream plenum section 140C are located on both sides of camber line 68. Downstream plenum section 142C also crosses camber line 68 so that portions of downstream plenum section 140C are located on both sides of camber line 68. As shown in FIG. 3, downstream plenum section 142C extends from suction side wall 26 to pressure side wall 24. Additionally, pressure side cavity 140 includes one row of cooling holes 30 while suction side cavity 142 includes one row of cooling holes 30A.

Figure 4:
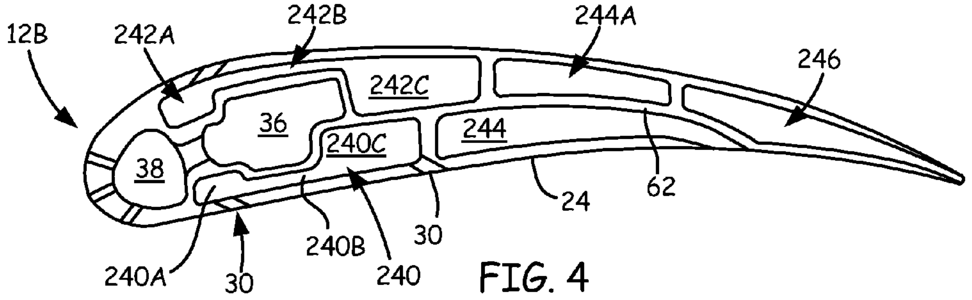
FIG. 4 is a cross section view of another embodiment of an airfoil.

FIG. 4 illustrates a cross section view of airfoil 12B, another embodiment of a blade or vane airfoil. Airfoil 12B differs from airfoils 12 and 12A shown in FIGS. 2 and 3, respectively.

Airfoil 12B includes pressure side cavity 240 and suction side cavity 242. Pressure side cavity 240 includes upstream plenum section 240A, intermediate section 240B and downstream plenum section 240C. Suction side cavity 242 includes upstream plenum section 242A, intermediate section 242B and downstream plenum section 242C. In the embodiment shown in FIG. 4, upstream plenum section 240A and downstream plenum section 240C both include a row of cooling holes 30. In one embodiment, both rows of cooling holes 30 are drilled through pressure side wall 24. FIG. 4 also illustrates that downstream plenum section 240C and downstream plenum section 242C are offset with respect to each other, where downstream plenum section 240C extends farther upstream and downstream plenum section 242C extends farther downstream.

Airfoil 12B also includes intermediate cavity 244, second intermediate cavity 244A and trailing edge cavity 246. Intermediate cavity 244 and second intermediate cavity 244A are separated by internal wall 62, which extends between intermediate cavity 244 and second intermediate cavity 244A and intermediate cavity 244 and trailing edge cavity 246. Second intermediate cavity 244A can receive cooling fluid from root section 14 or platform 16 and expel the cooling fluid through cooling holes on suction side wall 26 or to other cavities within airfoil 12B through openings in the internal walls (i.e. intermediate cavity 244 through openings in internal wall 62).

Figure 5:
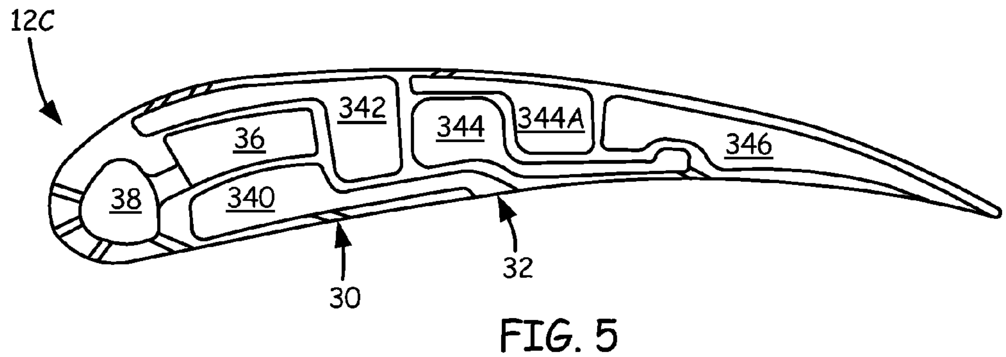
FIG. 5 is a cross section view of another embodiment of an airfoil.
Figure 6:
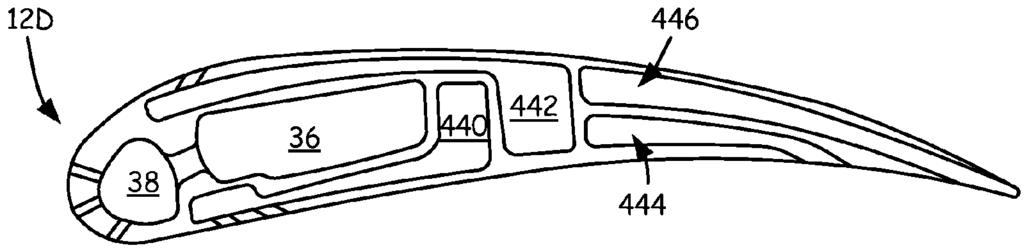
FIG. 6 is a cross section view of another embodiment of an airfoil.
Figure 7:
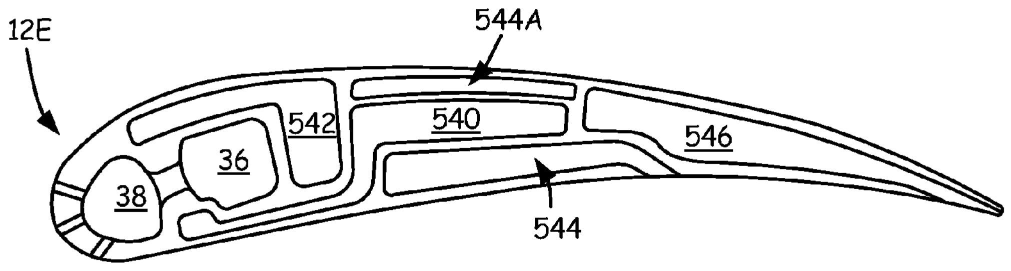
FIG. 7 is a cross section view of another embodiment of an airfoil.

FIGS. 5-7 illustrate cross section views of additional airfoils. Airfoil 12C in FIG. 5 illustrates pressure side cavity 340 having drilled cooling holes 30 and cast cooling holes 32, suction side cavity 342 without an upstream plenum section, and two intermediate cavities 344 and 344A. In this embodiment, cooling fluid enters pressure side cavity 340 from an upstream portion with the cooling fluid traveling through the cavity downstream to cooling holes 30 and 32. Intermediate cavity 344A is a flag cavity, while intermediate cavity 344 is a combination flag and dog bone cavity.

Airfoil 12D in FIG. 6 illustrates intermediate cavity 444 and trailing edge cavity 446 that extend upstream the same distance. Airfoil 12E in FIG. 7 illustrates pressure side cavity 540 that extends downstream between intermediate cavity 544 and second intermediate cavity 544A. Each of these different configurations provides a different airfoil cooling solution.

As shown in FIGS. 2-7, the arrangement and shape (e.g., dog bone, flag or combination) of internal cavities and cooling holes within airfoils 12-12E provide for different airfoil cooling schemes. While these embodiments do not exhaust all of the various design possibilities, they illustrate that airfoil cooling solutions can be tailored to specific needs based on the temperatures experienced by different portions of the airfoil. In each of the embodiments shown, feed cavity 36 is insulated from the high temperature regions of the airfoil and cooling holes that allow the expulsion of cooling fluid from the internal cavities of the airfoil can be formed by different methods (e.g., drilling and casting).

Figure 8:
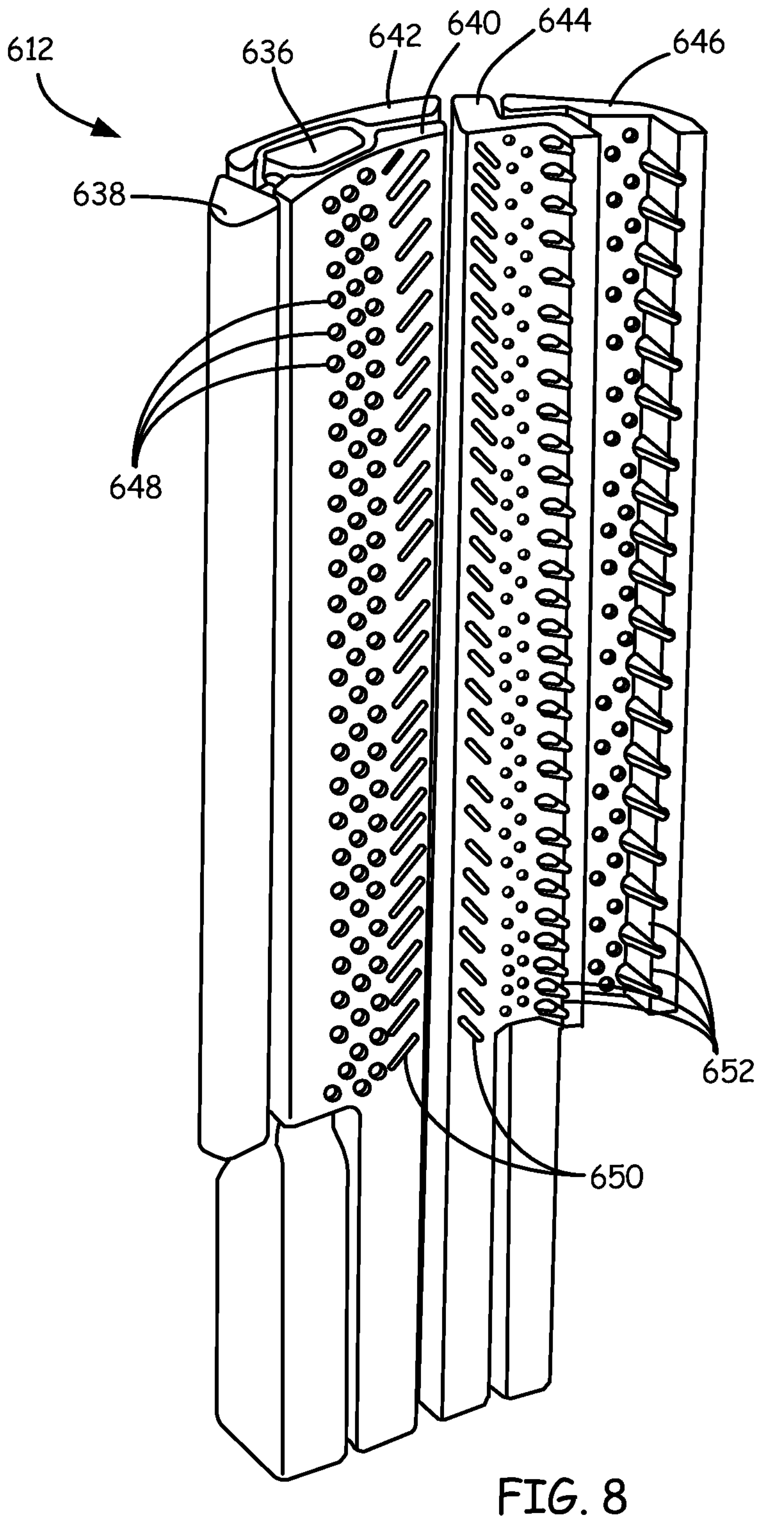
FIG. 8 is a perspective view of a core assembly used to cast the airfoil shown in FIGS. 1A, 1B and 2.

FIG. 8 illustrates core assembly 612 that can be used to form airfoil 12 shown in FIGS. 1A, 1B and 2. Core assembly 612 includes a number of ceramic cores that form the various internal cavities in airfoil 12 following casting. For example, in the embodiment shown in FIG. 8, ceramic core 638 forms impingement cavity 38, ceramic core 636 forms feed cavity 36, ceramic core ("dog bone" core) 640 forms pressure side cavity 40, ceramic core 642 forms suction side cavity 42, ceramic core ("flag" core) 644 forms intermediate cavity 44 and ceramic core 646 forms trailing edge cavity 46. The voids between adjacent ceramic cores form internal walls following casting. For example, the void between ceramic cores 644 and 646 will form internal wall 62 after casting. The ceramic cores are individually formed and then assembled together to form core assembly 612. The ceramic cores can be formed by conventional means or by additive manufacturing. Each ceramic core can be connected to one or more adjacent ceramic cores so that core assembly 612 is held together. The ceramic cores are generally connected to each other outside of the casting area (i.e. a region of the core that plays no direct role in the casting process, such as at the bottom of FIG. 8).

Some of the ceramic cores include openings and/or slots or depressions for forming pedestals and trip strips. Openings 648 generally extend through the entire width of a ceramic core and are filled in by material during casting to produce solid pedestals within the cooling circuit that block and shape the flow of the cooling fluid through the cooling circuit. Slots or depressions 650 generally extend through a portion of but not the entire width of a ceramic core and are filled in by material during casting to form trip strips within the cooling circuit that modify the flow of cooling fluid flowing past the trip strips.

Cast cooling holes and slots, such as cooling holes 32 and cooling slots 34, can be formed using lands 652. Lands 652 can have various shapes to produce cooling holes and slots of different shapes. For example, lands 652 can have a trapezoidal shape to produce diffusion cooling holes 32 through pressure side wall 24.

Drilled cooling holes, such as cooling holes 30 and 30A are formed after casting has been completed. Cooling holes 30 and 30A are drilled through pressure side wall 24 and/or suction side wall 26 so that the holes communicate with one of the internal cavities of airfoil 12 (e.g., pressure side cavity 40, suction side cavity 42). The increased cavity thickness of plenum sections 40A, 40C, 42A and 42B provide backstrike regions to prevent unintentional drilling of the internal walls of the airfoil. The ability to drill cooling holes 30 and 30A rather than casting the holes provides additional flexibility in the manufacturing of airfoils 12.

Discussion of Possible Embodiments

The following are non-exclusive descriptions of possible embodiments of the present invention.

An airfoil can include leading and trailing edges, a first exterior wall extending from the leading edge to the trailing edge and having inner and outer surfaces, a second exterior wall extending from the leading edge to the trailing edge generally opposite the first exterior wall and having inner and outer surfaces, and cavities within the airfoil. A first cavity can extend along the inner surface of the first exterior wall and a first inner wall and have an upstream end and a downstream end, and a feed cavity can be located between the first and second inner walls.

The airfoil of the preceding paragraph can optionally include, additionally and/or alternatively any, one or more of the following features, configurations and/or additional components:

The airfoil can further include an impingement cavity in fluid communication with the feed cavity, the impingement cavity having a plurality of cooling holes on or near the leading edge.

The first cavity can include a first plenum near one of the upstream and downstream ends of the first cavity and a region near the end of the first cavity opposite the first plenum for receiving a cooling fluid.

The airfoil can further include a plurality of cooling holes extending through the first exterior wall and in communication with the first plenum, where the first plenum includes a backstrike region for allowing holes to be drilled into the first exterior wall.

The airfoil can further include a second cavity extending along the inner surface of the second exterior wall and a second inner wall and have an upstream end and a downstream end, where the second inner wall separates the second cavity from the feed cavity.

The second cavity can include a second plenum near one of the upstream and downstream ends of the second cavity and a region near the end of the second cavity opposite the second plenum for receiving a cooling fluid.

The airfoil can further include a plurality of cooling holes extending through the second exterior wall and in communication with the second plenum, wherein the second plenum includes a backstrike region for allowing holes to be drilled into the second exterior wall.

At least one of the first and second cavities can extend across an airfoil camber line.

Both of the first and second cavities can extend across the airfoil camber line.

The airfoil can further include a third cavity extending along the inner surface of at least one of the first and second exterior walls and a plurality of cooling holes extending through at least one of the first and second exterior walls in communication with the third cavity.

A method of forming an airfoil can include forming a first ceramic core having a first side with a first length and a second side generally opposite the first side with a second length, forming a second ceramic core having a length generally greater than or equal to the first length, forming a core assembly and casting the airfoil. Forming the core assembly can include positioning the second ceramic core so that it is proximate but spaced from the first side of the first ceramic core. The core assembly can be used during casting to provide the airfoil with a central core passage and a first internal cooling circuit located on one side of the central core passage. The first internal cooling circuit can have a length generally greater than or equal to a length of the side of the central core passage proximate to the first internal cooling circuit.

The method of the preceding paragraph can optionally include, additionally and/or alternatively any, one or more of the following features, configurations and/or additional components:

The method can further include forming a third ceramic core having a length generally greater than or equal to the second length, where forming the core assembly further includes positioning the third ceramic core so that it is proximate but spaced from the second side of the first ceramic core, and where casting the airfoil provides the airfoil with a second internal cooling circuit located on a side of the central core passage generally opposite the first internal cooling circuit, and where the second internal cooling circuit has a length generally greater than or equal to a length of the side of the central core passage proximate to the second internal cooling circuit.

The method can further include forming a fourth ceramic core and positioning the fourth ceramic core upstream of the third ceramic core in the core assembly in order to provide the airfoil with an impingement cavity upon casting.

The second ceramic core can include an upstream region, an intermediate region and a downstream region, the second ceramic core can be formed so that the upstream and downstream regions each have a greater lateral thickness than the intermediate region, and the first internal cooling circuit of the cast airfoil can have upstream and downstream regions each with a greater lateral thickness than the intermediate region.

The method can further include drilling a cooling hole through an exterior wall of the airfoil and into the upstream region of the first internal cooling circuit.

The third ceramic core can include an upstream region, an intermediate region and a downstream region, the third ceramic core can be formed so that the upstream and downstream regions each have a greater lateral thickness than the intermediate region, and the second internal cooling circuit of the cast airfoil can have upstream and downstream regions each with a greater lateral thickness than the intermediate region.

The method can further include drilling a cooling hole through an exterior wall of the airfoil and into the upstream region of the second internal cooling circuit.

The method can further include forming a fifth ceramic core and positioning the fifth ceramic core downstream from at least one of the second and third ceramic cores in the core assembly in order to provide the airfoil with a third internal cooling circuit in communication with cooling outlets cast on an exterior wall of the airfoil.

The method can further include forming one of the first and second ceramic cores by additive manufacturing.

An airfoil can include a leading edge wall, a trailing edge and first and second exterior side walls extending between the leading edge wall and the trailing edge; a central feed cavity; an impingement cavity located between the central feed cavity and the leading edge wall; and a first cooling circuit insulating the central feed cavity from the first exterior side wall.

The airfoil of the preceding paragraph can optionally include, additionally and/or alternatively any, one or more of the following features, configurations and/or additional components:

The airfoil can further include a second cooling circuit insulating the central feed cavity from the second exterior side wall.

The airfoil can further include a plurality of cooling holes extending through the first exterior wall and in communication with the first cooling circuit, where the first cooling circuit includes a backstrike region for allowing holes to be drilled into the first exterior wall.

The airfoil can further include a third cavity extending along the inner surface of at least one of the first and second exterior walls and a plurality of cooling holes extending through at least one of the first and second exterior walls in communication with the third cavity.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An airfoil comprising:

leading and trailing edges;

a first exterior wall extending from the leading edge to the trailing edge and having inner and outer surfaces;

a second exterior wall extending from the leading edge to the trailing edge generally opposite the first exterior wall and having inner and outer surfaces;

a first cavity extending along the inner surface of the first exterior wall and a first inner wall, the first cavity having an upstream end and a downstream end, wherein the first cavity comprises:

a first plenum near one of the upstream and downstream ends of the first cavity; and a region near the end of the first cavity opposite the first plenum for receiving a cooling fluid; and a feed cavity located between the first inner wall and the second exterior wall.

2. The airfoil of claim 1, further comprising:

an impingement cavity in fluid communication with the feed cavity, the impingement cavity comprising a plurality of cooling holes on or near the leading edge.

3. The airfoil of claim 1, further comprising:

a plurality of cooling holes extending through the first exterior wall and in communication with the first plenum, wherein the first plenum comprises a backstrike region for allowing holes to be drilled into the first exterior wall.

4. The airfoil of claim 1, further comprising:

a second cavity extending along the inner surface of the second exterior wall and a second inner wall, the second cavity having an upstream end and a downstream end, wherein the second inner wall separates the second cavity from the feed cavity.

5. The airfoil of claim 4, wherein the second cavity comprises:

a second plenum near one of the upstream and downstream ends of the second cavity; and a region near the end of the second cavity opposite the second plenum for receiving a cooling fluid.

6. The airfoil of claim 5, further comprising:

a plurality of cooling holes extending through the second exterior wall and in communication with the second plenum, wherein the second plenum comprises a backstrike region for allowing holes to be drilled into the second exterior wall.

7. An airfoil comprising:

leading and trailing edges;

a first exterior wall extending from the leading edge to the trailing edge and having inner and outer surfaces;

a second exterior wall extending from the leading edge to the trailing edge generally opposite the first exterior wall and having inner and outer surfaces;

a first cavity extending along the inner surface of the first exterior wall and a first inner wall, the first cavity having an upstream end and a downstream end;

a feed cavity located between the first inner wall and the second exterior wall; and a second cavity extending along the inner surface of the second exterior wall and a second inner wall, the second cavity having an upstream end and a downstream end, wherein the second inner wall separates the second cavity from the feed cavity, wherein at least one of the first and second cavities extends across an airfoil camber line.

8. The airfoil of claim 7, wherein both of the first and second cavities extend across the airfoil camber line.

9. An airfoil comprising:

leading and trailing edges;

a first exterior wall extending from the leading edge to the trailing edge and having inner and outer surfaces;

a second exterior wall extending from the leading edge to the trailing edge generally opposite the first exterior wall and having inner and outer surfaces;

a first cavity extending along the inner surface of the first exterior wall and a first inner wall, the first cavity having an upstream end and a downstream end;

a feed cavity located between the first inner wall and the second exterior wall;

a second cavity extending along the inner surface of the second exterior wall and a second inner wall, the second cavity having an upstream end and a downstream end, wherein the second inner wall separates the second cavity from the feed cavity;

a third cavity extending along the inner surface of at least one of the first and second exterior walls; and a plurality of cooling holes extending through at least one of the first and second exterior walls in communication with the third cavity.

10. A method of forming an airfoil, the method comprising:

forming a first ceramic core comprising:

a first side having a first length; and a second side generally opposite the first side and having a second length;

forming a second ceramic core having a length generally greater than or equal to the first length, wherein the second ceramic core comprises an upstream region, an intermediate region and a downstream region, and wherein the second ceramic core is formed so that the upstream and downstream regions each have a greater lateral thickness than the intermediate region, and wherein the first internal cooling circuit of the cast airfoil has upstream and downstream regions each with a greater lateral thickness than the intermediate region;

forming a core assembly comprising:

positioning the second ceramic core so that it is proximate but spaced from the first side of the first ceramic core;

casting the airfoil using the core assembly to provide the airfoil with a central core passage and a first internal cooling circuit located on one side of the central core passage, wherein the first internal cooling circuit has a length generally greater than or equal to a length of the side of the central core passage proximate to the first internal cooling circuit.

11. The method of claim 10, further comprising:

forming a third ceramic core having a length generally greater than or equal to the second length, and wherein forming the core assembly further comprises positioning the third ceramic core so that it is proximate but spaced from the second side of the first ceramic core, and wherein casting the airfoil provides the airfoil with a second internal cooling circuit located on a side of the central core passage generally opposite the first internal cooling circuit, and wherein the second internal cooling circuit has a length generally greater than or equal to a length of the side of the central core passage proximate to the second internal cooling circuit.

12. The method of claim 10, further comprising:

forming a fourth ceramic core; and positioning the fourth ceramic core upstream of the third ceramic core in the core assembly in order to provide the airfoil with an impingement cavity upon casting.

13. The method of claim 12, further comprising:

drilling a cooling hole through an exterior wall of the airfoil and into the upstream region of the first internal cooling circuit.

14. The method of claim 11, wherein the third ceramic core comprises an upstream region, an intermediate region and a downstream region, and wherein the third ceramic core is formed so that the upstream and downstream regions each have a greater lateral thickness than the intermediate region, and wherein the second internal cooling circuit of the cast airfoil has upstream and downstream regions each with a greater lateral thickness than the intermediate region.

15. The method of claim 14, further comprising:

drilling a cooling hole through an exterior wall of the airfoil and into the upstream region of the second internal cooling circuit.

16. A method of forming an airfoil, the method comprising:

forming a first ceramic core comprising: a first side having a first length; and a second side generally opposite the first side and having a second length;

forming a second ceramic core having a length generally greater than or equal to the first length;

forming a core assembly comprising: positioning the second ceramic core so that it is proximate but spaced from the first side of the first ceramic core;

casting the airfoil using the core assembly to provide the airfoil with a central core passage and a first internal cooling circuit located on one side of the central core passage, wherein the first internal cooling circuit has a length generally greater than or equal to a length of the side of the central core passage proximate to the first internal cooling circuit;

forming a third ceramic core having a length generally greater than or equal to the second length, and wherein forming the core assembly further comprises positioning the third ceramic core so that it is proximate but spaced from the second side of the first ceramic core, and wherein casting the airfoil provides the airfoil with a second internal cooling circuit located on a side of the central core passage generally opposite the first internal cooling circuit, and wherein the second internal cooling circuit has a length generally greater than or equal to a length of the side of the central core passage proximate to the second internal cooling circuit;

forming a fourth ceramic core; and positioning the fourth ceramic core upstream of the third ceramic core in the core assembly in order to provide the airfoil with an impingement cavity upon casting;

forming a fifth ceramic core; and positioning the fifth ceramic core downstream from at least one of the second and third ceramic cores in the core assembly in order to provide the airfoil with a third internal cooling circuit in communication with cooling outlets cast on an exterior wall of the airfoil.

17. A method of forming an airfoil, the method comprising:

forming a first ceramic core comprising:

a first side having a first length; and a second side generally opposite the first side and having a second length;

forming a second ceramic core having a length generally greater than or equal to the first length, wherein one of the first and second ceramic cores is formed by additive manufacturing;

forming a core assembly comprising:

positioning the second ceramic core so that it is proximate but spaced from the first side of the first ceramic core; and casting the airfoil using the core assembly to provide the airfoil with a central core passage and a first internal cooling circuit located on one side of the central core passage, wherein the first internal cooling circuit has a length generally greater than or equal to a length of the side of the central core passage proximate to the first internal cooling circuit.

18. An airfoil comprising:

a leading edge wall, a trailing edge and first and second exterior side walls extending between the leading edge wall and the trailing edge;

a central feed cavity;

an impingement cavity located between the central feed cavity and the leading edge wall;

a first cooling circuit insulating the central feed cavity from the first exterior side wall; and a plurality of cooling holes extending through the first exterior wall and in communication with the first cooling circuit, wherein the first cooling circuit comprises a backstrike region for allowing holes to be drilled into the first exterior wall.

19. The airfoil of claim 18, further comprising:

a second cooling circuit insulating the central feed cavity from the second exterior side wall.

20. An airfoil comprising:

a leading edge wall, a trailing edge and first and second exterior side walls extending between the leading edge wall and the trailing edge;

a central feed cavity;

an impingement cavity located between the central feed cavity and the leading edge wall;

a first cooling circuit insulating the central feed cavity from the first exterior side wall;

a second cooling circuit insulating the central feed cavity from the second exterior side wall;

a third cavity extending along the inner surface of at least one of the first and second exterior walls; and a plurality of cooling holes extending through at least one of the first and second exterior walls in communication with the third cavity.

* * * * *